UNITED STATES PATENT OFFICE 2,667,484

2,4-DIAMINOPTERIDINE ALDEHYDES

Harold G. Petering, Kalamazoo, Mich., assignor to The Upjohn Company, Kalamazoo, Mich., a corporation of Michigan No Drawing. Application July 22, 1950,
Serial No. 175,476

6 Claims. (Cl. 260—251.5)

This invention relates to 2,4-diaminopteridine aldehydes having the formula:

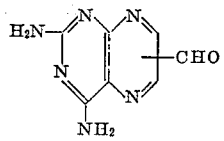

wherein the aldehyde or formyl group is attached to the 6- or 7-position of the pteridine ring, aldehyde derivatives such as the oximes, semi-carbazones, thiosemicarbazones, phenylhydrazones thereof, and to a method for their preparation.

The products of this invention have been prepared and found to be brown to light tan solids which are very soluble in aqueous acids and alkalis, less soluble in water at pH 7.0 and relatively insoluble in most common organic solvents. They are stable compounds and may be handled and used in further chemical reactions with no more precautions as to their stability than is customarily taken with aldehydes. They also readily yield the common aldehyde derivatives. They char and decompose without melting when heated above 300 degrees centigrade and are best characterized by their distinctive ultraviolet absorption spectra in acid and alkaline solution and the ratios of their extinction coefficients at the absorption maxima. The freedom from the isomeric aldehyde can be ascertained from the numerical value of the $$E\frac{260\text{–}262 \text{ mu}}{370 \text{ mu}}$$

ratio as determined in 0.1 normal sodium hydroxide solution and the $$E\frac{248 \text{ mu}}{335 \text{ mu}}$$

ratio as determined in 0.1 normal hydrochloric acid solution. When the numerical value of the $$E\frac{260\text{–}262 \text{ mu}}{370 \text{ mu}}$$

ratio is 2.0–2.2 the product is predominately the 6-aldehyde with the value 1.9 denoting practically pure 6-aldehyde. When the $$E\frac{260\text{–}262 \text{ mu}}{370 \text{ mu}}$$

ratio if 2.4–2.6 the product is predominately 7-aldehyde with the value 2.6 denoting practically pure 7-aldehyde. When the numerical value of the $$E\frac{248 \text{ mu}}{335 \text{ mu}}$$

ratio is 1.4–1.5 the product is the 6-aldehyde while a value of 1.0–1.1 denotes the 7-aldehyde. These aldehydes are useful as intermediates in the synthesis of folic acid antagonist and are themselves useful as anti-viral agents and enzyme inhibitors.

It is an object of this invention to provide new compounds that are valuable as intermediates in the synthesis of folic acid acid antagonists and related compounds. A further object is the provision of 2,4-diaminoformylpteridines having the formula given above, and the oxime, phenyl hydrazone, thiosemicarbazone and other aldehyde derivatives thereof. An additional object of this invention is to provide a process whereby such compounds may be prepared from 2,4-diaminopolyhydroxyalkylpteridines containing either a terminal hydroxyl or a terminal carboxyl group. A still further object of this invention is the provision of such a process whereby the oxidation is caused to occur with lead tetraacetate or periodic acid as the active oxidizing agent. Other objects of the invention will become apparent hereinafter.

It is known that certain polyhydroxyalkyl compounds, in particular carbohydrates, are oxidized in a more or less special manner by lead tetraacetate and periodic acid to yield aldehydes and carboxylic acids rather than the usual carbondioxide and carboxylic acids. However, the perculiarities of this reaction are so numerous that the art is unable to predict what would result from the oxidation of a 2,4-diaminopolyhydroxyalkylpteridine with these reagents. It has now been found that 2,4-diamino-6-polyhydroxyalkyl and 2,4-diamino-7-polyhydroxyalkylpteridines may be oxidized to the corresponding 2,4-diamino-6-formyl and 2,4-diamino-7-formylpteridines regardless of the stero chemical configuration or the length of the polyhydroxyalkyl side-chain or of the substituent on the terminal carbon atom in the starting compound. The 2,4-diamono-6- (and 7-) polyhydroxyalkylpteridines which are useful as starting materials in the process of this invention, and a method for their preparation, have been described and claimed in the copending applications Serial No. 175,477 and Serial No. 175,478, now Patent No. 2,568,462, filed of even date herewith. According to the method of the copending application Serial No. 175,477 2,4-diamino-6-polyhydroxyalkylpteridines can be prepared by reacting a polyhydroxyaldehyde or a polyhydroxyketone with 2,4,5,6-tetraaminopyrimidine in aqueous solution at a pH between about 5.0 and 6.5 preferably in the presence of hydrazine. The above reaction is accelerated by moderate heating, as on a steam bath. The desired product can be precipitated from the reaction mixture by cooling and separating, as by filtration, and can then be purified by dissolving in dilute alkali, decolorizing with adsorbent charcoal and recovering by acidification and filtration or by simple washing of the original precipitate with water and organic solvents. The 2,4-diamino-7-polyhydroxyalkylpteridines can be prepared by reacting the osone of a monosaccharide having at least four carbon atoms with 2,4,5,6-tetraaminopyrimidine in aqueous solution at a pH of between about 4.5 and 6.5. The isolation of the product is carried out in the same manner as described for the 6-isomer above. According to copending application 175,478, now Patent No. 2,568,462 using the same procedure, 2,4,5,6-tetraaminopyrimidine can be condensed with 5-ketogluconic acid preferably in the presence of hydrazine whereby a 6-polyhydroxyalkylpteridine is obtained having a carboxyl group upon the terminal carbon atom.

The 2,4-diamino-6-(or 7-)polyhydroxyalkylpteridines thus obtained can be oxidized to the 2,4-diamino-6-(or 7-)formylpteridines of this invention by mixing an excess of purified lead tetraacetate dissolved in warm glacial acetic acid, or a mixture of glacial acetic acid and acetic anhydride, with an aqueous solution of the polyhydroxyalkylpteridine. The reaction is rapid and exothermic. While the starting polyhydroxyalkylpteridines may be dissolved in water as above, in which they are soluble to the amount of about one-half percent at 100 degrees centigrade, it is preferred that small amounts of alkali such as an alkali metal hydroxide, carbonate and bicarbonate or ammonium hydroxide be used to effect solution. Alternatively, the aqueous solution can be acidified to about pH 3.0 prior to the addition of the lead tetraacetate solution. However the use of small quantities of alkali is a preferred procedure as the volume of solution required is sufficiently reduced to be of practical importance. An alkaline solution can be used to dissolve the starting polyhydroxyalkylpteridine since the large excess of acid added, along with the lead acetate assures that the resulting aldehyde will not be destroyed by the added alkali.

The exothermic nature of the reaction causes the temperature to rise somewhat, the final temperature being dependent upon the volume of the solutions. After mixing, and allowing the reaction to proceed with the normal rise in temperature caused by the nature of the reaction, the reaction mixture is brought to about 90 to 100 degrees centigrade for an additional length of time to complete the oxidation. This additional time required varies, depending upon the quantity of reactants, with up to about one-half hour being sufficient.

After the oxidation is complete, the $PbO_2$, formed as a by-product of the reaction, is removed preferably by filtration. The lead acetate formed is converted to insoluble lead sulfate by the addition of dilute sulfuric acid or a sulfate salt such as ammonium sulfate, whereupon the lead sulfate which precipitates is removed. After removal of the lead upon cooling, the filtrate deposits crystals of the desired aldehyde which are collected for further purification as desired.

The 2,4-diamino-6-(or 7-)polyhydroxyalkylpteridines can also be oxidized to 2,4-diamino-6-(or 7-)formyl pteridines by mixing a solution of the 2,4-diaminopolyhydroxyalkylpteridine in an aqueous acid solution such as aqueous acetic or sulfuric acid with an aqueous solution of periodic acid. The reaction is quite rapid at temperatures between about 25 and 40 degrees centigrade although temperatures of up to about 60 degrees centigrade are satisfactory. The reaction is not exothermic so external heat must be applied when the reaction is carried out above room temperature. After completion of the reaction the acidity of the solution is reduced to between about pH 4.0 to pH 6.0 by the addition of alkali the cooled reaction mixture deposits the 2,4-diamino-6-(or 7-)formyl pteridine as a solid, which is collected for use or further purification as desired.

The following examples are given to illustrate certain preferred embodiments of this invention but such modifications as are apparent to those skilled in the art to which this invention pertains can be made without departing from the spirit and scope of this invention.

PREPARATION 1.—2,4-DIAMINO-6-TETRAHYDROXYBUTYL-(L-XYLO)-PTERIDINE

A dry mixture was prepared containing 1.065 grams of 2,4,5,6-tetraaminopyrimidine dihydrochloride; 0.85 gram of sodium bicarbonate and 1.8 grams of L-sorbose. To the dry mixture 13 milliliters of water was added, followed by 1.0 milliliter of acetic acid and 0.6 milliliter of an 85 percent solution of hydrazine hydrate. The pH of the solution was adjusted from about 7.0 to about pH 5-6 by the addition of glacial acetic acid, one-half milliliter being sufficient. The reaction mixture was heated on a water bath to 95-100 degrees centigrade for about two hours and then cooled to about five degrees centigrade for 16 hours. The brown precipitate which had formed was collected, washed with alcohol, acetone-ether and dried. There was thus obtained 0.67 gram of 2,4-diamino-6-tetrahydroxybutyl-(L-xylo)-pteridine as a brown powder which had an $$E \frac{257 \text{ mu}}{370 \text{ mu}} = 2.8$$

In a condensation carried out as above, the addition 0.60 gram of boric acid after completion of the heating period gave 1.51 grams of pteridine as the diboric acid complex which had an $$E \frac{257 \text{ mu}}{370 \text{ mu}} \text{ of } 2.9$$

When carried out in a like manner the condensation of L-xylose and 2,4,5,6-tetraaminopyrimidine gives 2,4-diamino-6-trihydroxypropyl pteridine.

PREPARATION 2.—2,4-DIAMINO-7-TETRAHYDROXYBUTYL (L-XYLO)-PTERIDINE

To a mixture of 800 milligrams of 2,4,5,6-tetraaminopyrimidine hydrosulfate and 600 milligrams of sodium bicarbonate, ten milliliters of water added and the mixture stirred vigorously. The pH of the solution was adjusted to a pH of 6.5 by the addition of sodium acetate and then added to 32 milliliters of a solution containing 650 milligrams of L-sorbosone (also called L-gulosone). One gram of boric acid was added and the solution was warmed on a steam bath until all of the reactants were in solution after which the reaction mixture was heated to about 75 degrees centigrade for ten minutes. The reaction mixture was cooled and the resulting precipitate was collected and washed successively with 40 milliliters of water, ethanol and ether after which it was dried. There was thus obtained 690 milligrams of 2,4-diamino-7-tetrahydroxybutyl(L-xylo)-pteridine as a tan powder whose ultraviolet absorption spectra in 0.1 normal NaOH solution showed minima at 235 mu and 310 mu and maxima at 255 mu and 365 mu, having an $$E\frac{255 \text{ mu}}{365 \text{ mu}}$$

ratio of 2.5. In 0.1 normal HCl maxima were observed at 240 mu, 285 mu and 335 mu and $$E\frac{240 \text{ mu}}{335 \text{ mu}}=1.0$$

When carried out in a like manner the condensation of 2,4,5,6-tetraaminopyrimidine with glucosone gives 2,4-diamino-7-tetrahydroxybutyl(D-arabo)pteridine and with L-xylosone gives 2,4-diamino-7-trihydroxypropylpteridine.

PREPARATION 3.—2,4-DIAMINO-6-OMEGA CARBOXY-TRIHYDROXYPROPYL-PTERIDINE

To a dry mixture of 1.065 grams of 2,4,5,6-tetraaminopyrimidine hydrochloride, 1.36 grams of sodium acetate trihydrate, 2.36 grams of calcium 5-keto gluconate and 600 milligrams of boric acid a solution of 1.4 milliliters of glacial acetic acid, 0.6 milliliter of 85 percent hydrazine hydrate and 10 milliliters of water was added. The resulting bright yellow solution had a pH of 4.5 to 5.0. The reaction mixture was warmed to 85–95 degrees centrigrade for about 45 minutes, the solution becoming dark brown. Upon cooling a precipitate formed which was collected, washed twice with water, once with alcohol and once with ether. After drying at 60 degrees centigrade under reduced pressure there was obtained 1.74 grams of 2,4-diamino-6-omega carboxytrihydroxypropylpteridine as a light brown powder having ultraviolet absorption maxima in 0.1 normal NaOH solution at 257 mu and 370 mu, minima at 238 mu and 322 mu and an $$E\frac{257 \text{ mu}}{370 \text{ mu}}$$

ratio of 3.1.

*Example 1.—2,4-diamino-6-formylpteridine by lead tetraacetate oxidation*

One and forty one-hundredths grams of 2,4-diamino-6-tetrahydroxybutylpteridine was dissolved in 75 milliliters of 25 percent aqueous acetic acid. The pH of the resulting solution was 3.0. To this solution 10.3 grams of $Pb_3O_4$ was added portionwise with stirring over a period of thirty minutes. The reaction mixture was allowed to stand for about twenty minutes after which time all of the $Pb_3O_4$ had gone into solution and the temperature of the reaction mixture had risen to about 40 degrees centigrade. Two hundred milligrams of activated carbon was added to the cloudy solution and after stirring was allowed to stand for fifteen minutes, then filtered and to the clear filtrate there was added a solution of 6.0 grams of ammonium sulfate in fifteen milliliters of water. A white precipitate of lead sulfate appeared which was removed and the resulting clear yellow solution divided for isolation into two portions.

Portion 1 was extracted twice with 250 milliliter quantities of ether. A yellow precipitate appeared in the aqueous layer and upon cooling further precipitation took place. The precipitate was collected, washed with alcohol then a mixture of acetone and ether, whereupon 70 milligrams of yellow 2,4-diamino-6-formylpteridine was obtained.

Portion 2 was adjusted to pH 5.0 with sodium carbonate whereupon a yellow precipitate appeared which after cooling the solution was collected and washed with water, alcohol, ether and dried. There was thus obtained 65 milligrams of yellow to tan 2,4-diamino-6-formylpteridine.

The mother liquor from the two portions, which still contain aldehyde, were combined and to the solution there was added an excess of phenylhydrazine. The reaction mixture was warmed on a steam bath to about ninety degrees centigrade whereupon a deep red precipitate appeared which was collected after cooling the reaction mixture. The precipitate was washed with water, alcohol, and then ether and after drying 180 milligrams of 2,4-diamino-6-formylpteridine phenylhydrazone was obtained as a red powder.

*Example 2.—2,4-diamino-6-formylpteridine by lead tetraacetate oxidation*

Seven hundred milligrams of 2,4-diamino-6-tetrahydroxybutylpteridine was dissolved in fifty milliliters of tenth normal sodium hydroxide solution and warmed to about forty degrees centigrade. A solution of four grams of lead tetraacetate which had been dissolved in 25 milliliters of acetic acid and five milliliters of acetic anhydride and warmed to fifty to sixty degrees centigrade was added rapidly to the pteridine solution. A brown precipitate of lead dioxide appeared after which 1.5 grams of ammonium sulfate was added with stirring, 200 milligrams of activated carbon was added to the reaction mixture and the solution then filtered. The orange to red filtrate was extracted four times with ether, a brown precipitate appearing after the third extraction. The solution was then cooled and the precipitate which had formed was collected and washed with water, acetone, and ether. There was thus obtained 160 milligrams of 2,4-diamino-6-formylpteridine as a tan powder whose ultraviolet absorption spectra in tenth normal sodium hydroxide solution showed maxima at 262 mu and 370 mu and a minimum at 315 mu with an $$E\frac{262 \text{ mu}}{370 \text{ mu}}$$

ratio of 2.19. In another similar reaction a 62 percent yield of aldehyde was obtained having an $$E\frac{262 \text{ mu}}{370 \text{ mu}}$$

ratio of 2.0.

*Example 3.—2,4-diamino-6-formylpteridine thiosemicarbazone*

To a solution of forty milligrams of 2,4-diamino-6-formylpteridine there was added an excess of thiosemicarbazide and the reaction mixture warmed on a steam bath for about twenty minutes. A yellow precipitate formed, which after cooling the reaction mixture was collected, washed with water, acetone, ether and then dried. There was thus obtained 37 milligrams of 2,4-diamino - 6 - formylpteridine thiosemicarbazone whose ultraviolet absorption spectra showed maxima at 265 mu, 340 mu and 405 mu and minima at 245 mu, 305 mu and 370 mu.

*Example 4.—2,4- diamino - 6 - formylpteridine oxime*

To a solution of 500 milligrams of 2,4-diamino-6-formylpteridine in a mixture of water and acetic acid, an aqueous solution containing 100 milligrams hydroxylamine hydrochloride was added and the pH of the resulting deep yellow solution adjusted to between 6 and 7 by the addition of sodium hydroxide solution. The precipitate which formed was collected, washed with water, acetone, ether and dried. There was thus obtained fifty milligrams of 2,4-diamino-6-formylpteridineoxime as a tan powder whose ultraviolet absorption spectra in 0.08 normal sodium hydroxide solution showed maxima at 262 mu and 382 mu with a minimum at 342 mu and 240 mu and a point of inflection at about 305 mu.

*Example 5.—2,4-diamino-6-formylpteridine*

Seven hundred and ninety milligrams of 2,4-diamino-6-1',2',3'-trihydroxy-4'-carboxypropylpteridine, 10.2 grams of sodium acetate and 100 milliliters of water were warmed on a steam bath. Ammonium hydroxide was added to the warm solution whereupon a dark brown solution of the pteridine was obtained. While maintaining the reaction temperature between about fifty and about sixty degrees centigrade, a solution of 2.6 grams of lead tetraacetate dissolved in a mixture of seventeen milliliters of acetic acid, ten milliliters of acetic anhydride and fifty milliliters of absolute methanol was added to the pteridine solution. The reaction temperature was maintained at about fifty to about sixty degrees centigrade for an additional twenty minutes whereupon it was brought to boiling and filtered to remove the lead dioxide which had precipitated. The reaction mixture was then cooled and slight excess of dilute sulfuric acid added and the lead sulfate which formed was removed. Upon further cooling the brown precipitate which appeared was collected and after washing with water, alcohol, ether and drying 200 milligrams of 2,4-diamino-6-formylpteridine was obtained as a brown powder.

*Example 6.—2,4-diamino-7-formylpteridine by periodate and lead tetraacetate oxidation*

Two hundred and five milligrams of 2,4-diamino-7-tetrahydroxybutyl (L-xylo)-pteridine was suspended in five milliliters of water and sulfuric acid added until a clear solution was obtained. With stirring 350 milligrams of HIO₄.2H₂O dissolved in one milliliter of water was added in one portion, an orange colored solution resulting. Activated charcoal, fifty milligrams (Darco G-60) was added and the reaction mixture stirred at room temperature for an additional thirty minutes. The mixture was clarified, the pH of the resulting clear solution adjusted from pH 1.0 to pH 6.0 by the addition of ammonium hydroxide and acetic acid. Upon refrigeration a heavy yellow precipitate separated which was collected, washed with water, alcohol and ether. After drying under reduced pressure there was obtained sixty milligrams of 2,4-diaminopteridine-7-aldehyde as a yellow solid whose ultraviolet absorption spectra when determined in 0.1 normal sodium hydroxide solution showed maxima at 258 mu and 370 mu, minima at 236 mu and 310 mu and an extinction coefficient ratio $$E\frac{258\ mu}{370\ mu}\ of\ 2.43$$

When 205 milligrams of 2,4-diamino-7-tetrahydroxybutyl (L-xylo) pteridine was oxidized with lead tetraacetate as in Example 2, fifty milligrams 2,4-diaminopteridine-7-aldehyde having the same ultraviolet absorption spectra and extinction coefficient ratio as that obtained by the periodate oxidation.

*Example 7.—2,4-diamino-6-formylpteridine by periodate oxidation*

To a solution of 510 milligrams of 2,4-diamino-6-tetrahydroxybutyl (L-xylo) pteridine in eleven milliliters of two normal acetic acid was added 855 milligrams of HIO₄.2H₂O dissolved in two milliliters of water. After standing ten minutes at room temperature the precipitate which had formed was collected, washed with acetone, ether and dried. There was thus obtained 130 milligrams of 2,4-diamino-6-formylpteridine as a brown solid.

*Example 8.—Periodate oxidation*

To a solution of 2.5 grams of HIO₄.2H₂O dissolved in thirty-two milliliters of two normal sulfuric acid at a temperature of 35 to 40 degrees centigrade, 1.0 gram of 2,4-diamino-6-tetrahydroxybutyl-(D-arabo) pteridine was added portionwise. During the addition a small amount of purple vapor appeared. After the addition was complete the reaction mixture was warmed to about sixty degrees centigrade. Activated charcoal, 200 milligrams, was added with stirring and after standing for about fifteen minutes the reaction mixture was filtered. The pH of the filtrate was adjusted to about 4.0 by the addition of sodium carbonate and sodium acetate. On cooling a heavy precipitate separated which was collected, washed three times with water, twice with alcohol and once with ether. After drying under reduced pressure at about sixty degrees centigrade 300 milligrams of 2,4-diamino-6-formylpteridine was obtained as a yellow solid.

I claim:

1. A compound selected from the group consisting of 2,4-diamino-6-formylpteridines, 2,4-diamino-7-formylpteridines and aldehyde derivatives thereof.
2. 2,4-diamino-6-formylpteridine.
3. 2,4-diamino-7-formylpteridine.
4. 2,4-diamino-6-formylpteridineoxime.
5. 2,4-diamino-6-formylpteridinethiosemicarbazone.
6. 2,4-diamino-6-formylpteridinephenylhydrazone.

HAROLD G. PETERING.

References Cited in the file of this patent

UNITED STATES PATENTS

| Number | Name | Date |
|---|---|---|
| 2,520,156 | Lindlar et al. | Aug. 29, 1950 |

FOREIGN PATENTS

| Number | Country | Date |
|---|---|---|
| 626,171 | Great Britain | July 11, 1949 |

OTHER REFERENCES

Skipper et al., Cancer 3, 348-353 (1950).
Daniel et al., J. Biol. Chem. 169, 689-697 (1947).
Petering et al., J. Am. Chem. Soc., 69, 2566-2567 (1947).
Seeger et al., J. Am. Chem. Soc., 69, 2567 (1947).